(No Model.)  6 Sheets—Sheet 1.
J. P. WRIGHT.
MACHINE FOR SANDING BOX SHUCKS.

No. 603,520. Patented May 3, 1898.

Witnesses:
Jas. E. Hutchinson.
Henry C. Hazard.

Inventor.
Jacob P. Wright (No Model.) 6 Sheets—Sheet 2.
J. P. WRIGHT.
MACHINE FOR SANDING BOX SHUCKS.

No. 603,520. Patented May 3, 1898.

(No Model.)  6 Sheets—Sheet 4.
J. P. WRIGHT.
MACHINE FOR SANDING BOX SHUCKS.

No. 603,520. Patented May 3, 1898.

(No Model.) 6 Sheets—Sheet 5.
J. P. WRIGHT.
MACHINE FOR SANDING BOX SHUCKS.

No. 603,520. Patented May 3, 1898.

Witnesses:
Jas. E. Hutchinson.
Henry C. Hazard.

Inventor.
Jacob P. Wright
by Pringle & Russell
his Attorneys (No Model.) 6 Sheets—Sheet 6.

J. P. WRIGHT.
MACHINE FOR SANDING BOX SHUCKS.

No. 603,520. Patented May 3, 1898.

Witnesses:
Jas. E. Hutchinson.
Henry C. Hazard.

Inventor:
Jacob P. Wright
Pringle and Russell
his Attorneys

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS.

MACHINE FOR SANDING BOX-SHUCKS.

SPECIFICATION forming part of Letters Patent No. 603,520, dated May 3, 1898.

Application filed December 23, 1896. Serial No. 616,811. (No model.)

*To all whom it may concern:*

Be it known that I, JACOB P. WRIGHT, of New Haven, in the county of New Haven, and in the State of Connecticut, have invented certain new and useful Improvements in Mechanism for Sanding Box-Shucks; and I do hereby declare that the following is a full, clear, and exact description thereof, reference being had to the accompanying drawings, in which—

Figure 1:
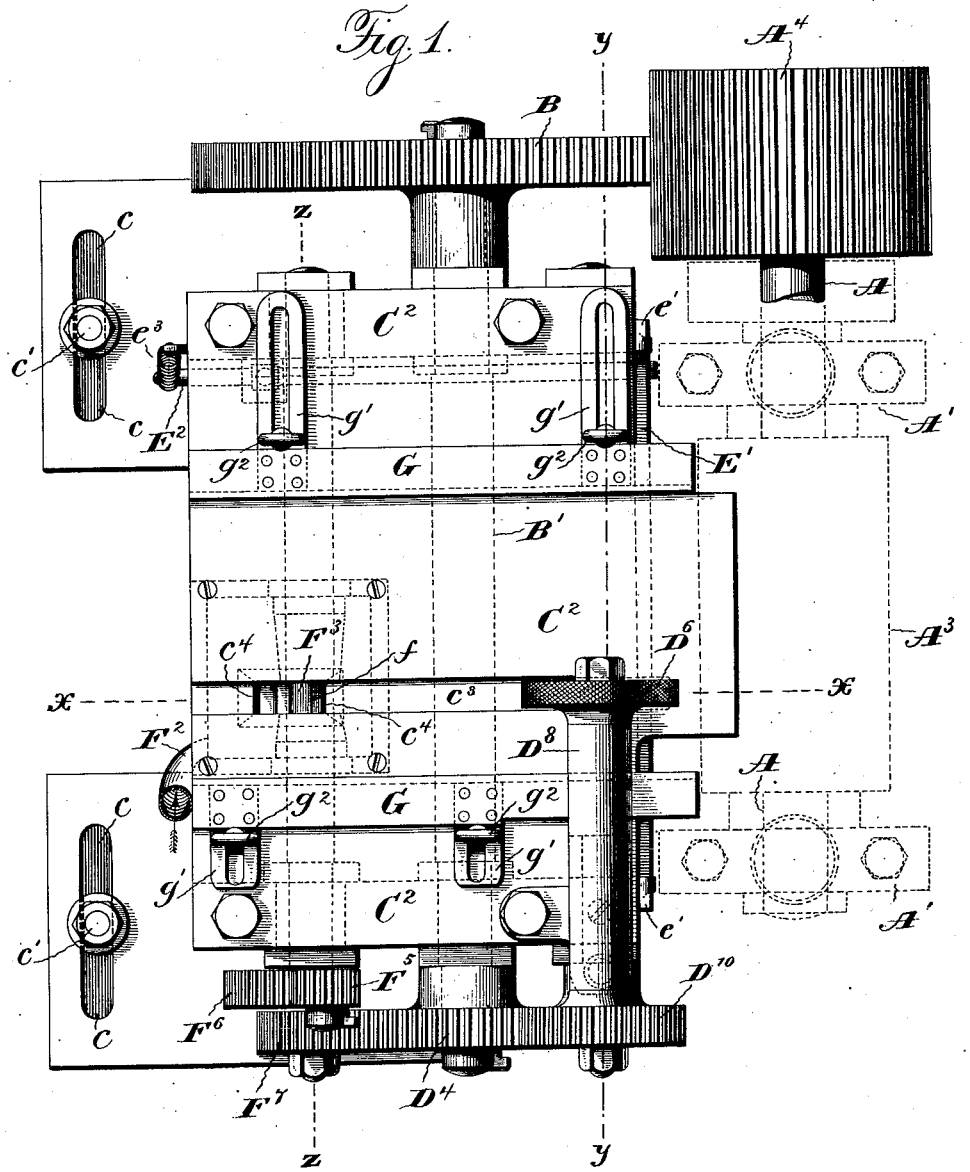
Figure 2:
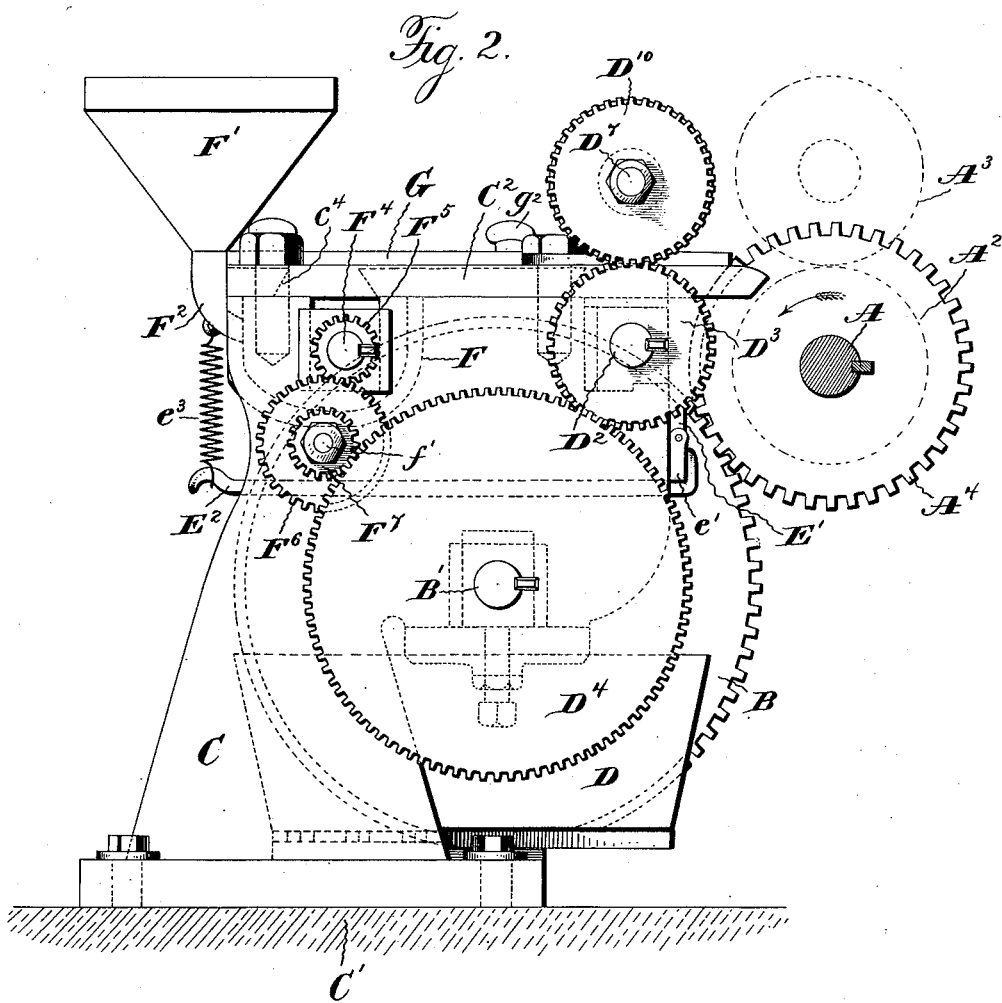
Figure 3:
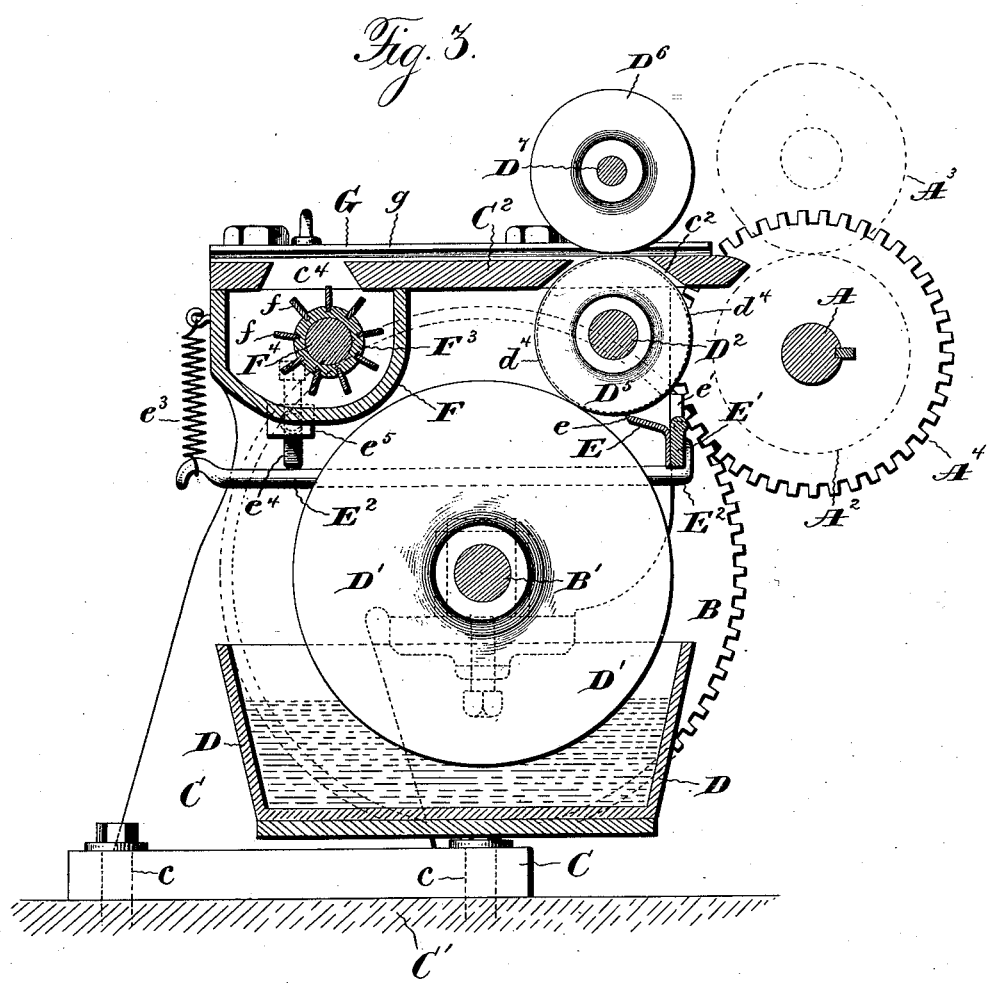
Figure 4:
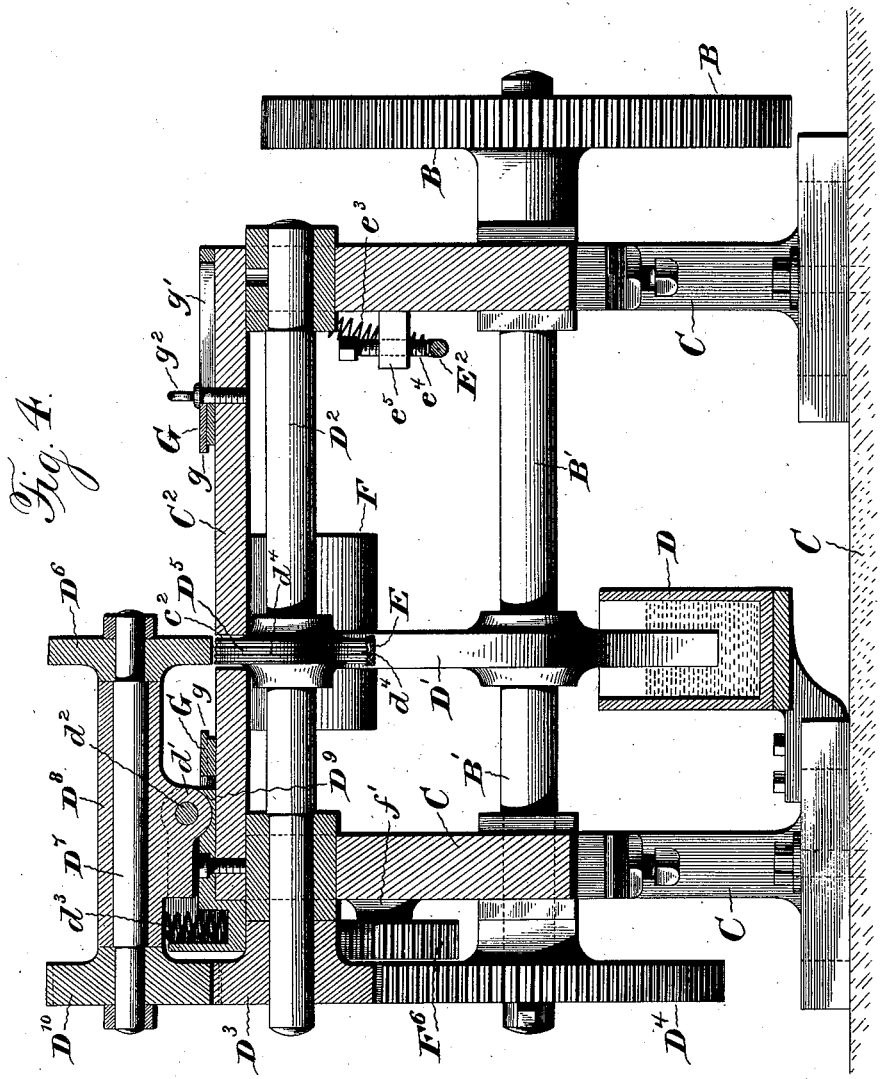
Figure 5:
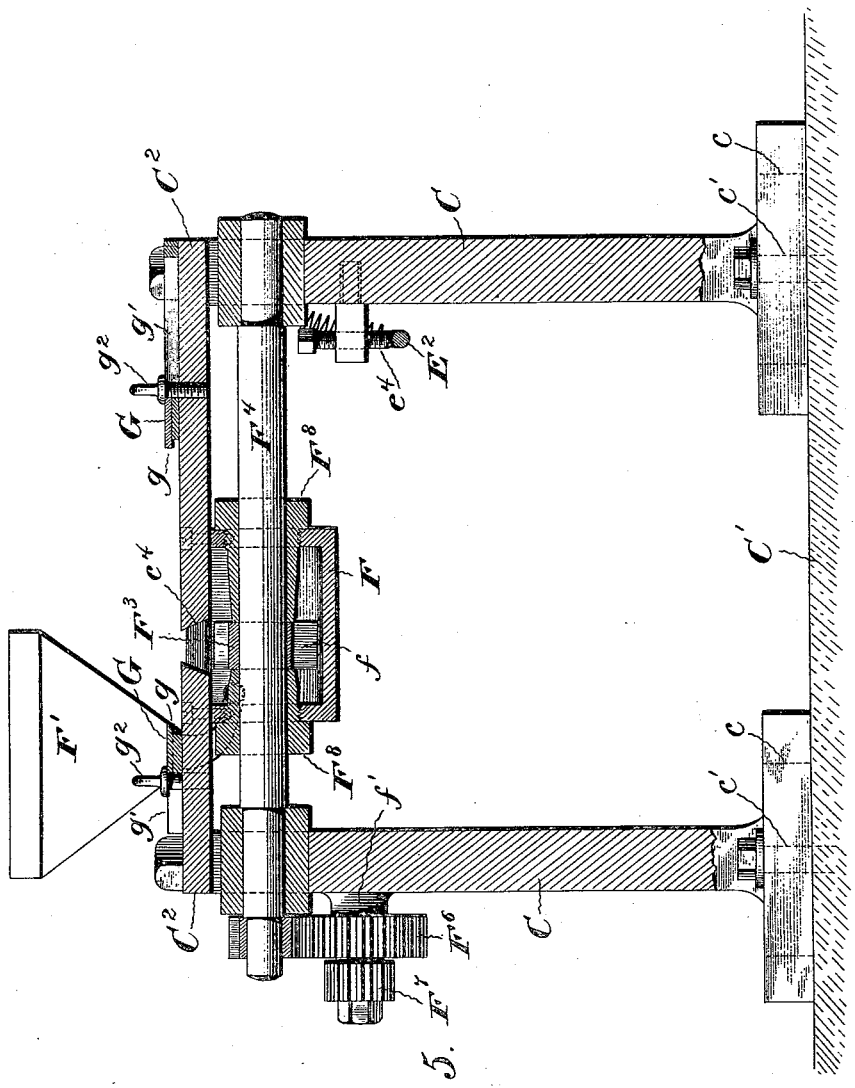
Figure 6:
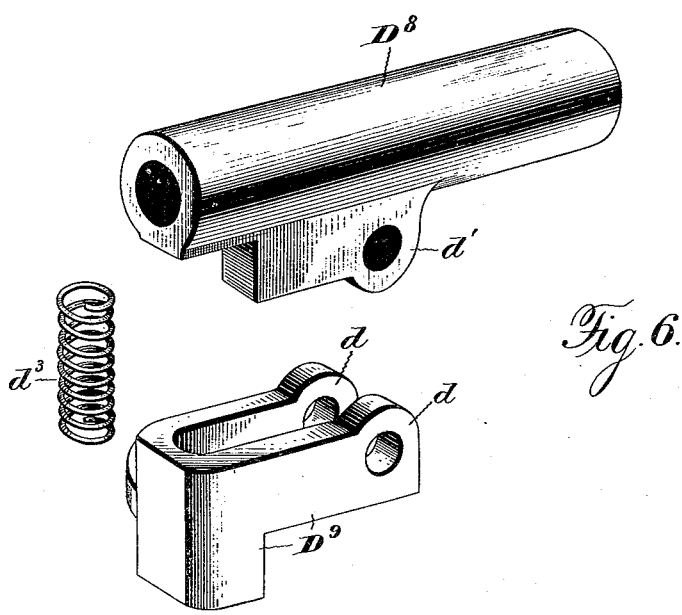
Figure 7:
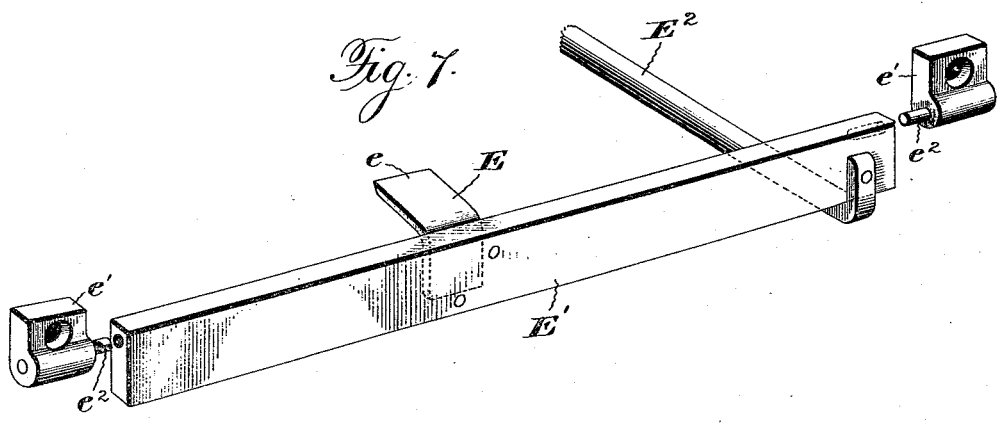

Figure 1 shows a plan view of my improved sanding device as applied to a machine for making and delivering shucks for match-boxes, with the sand-hopper removed; Fig. 2, a view of the same in side elevation; Fig. 3, a view of a vertical section on line $x$ $x$ of Fig. 1; Fig. 4, a view of a vertical section on line $y$ $y$ of Fig. 1; Fig. 5, a view of a section on line $z$ $z$ of Fig. 1, showing the sand-hopper in elevation; Fig. 6, a detail perspective view showing the part of the yielding bearing for the pressure-wheel, and Fig. 7 a similar view showing the scraper and its swinging support.

Letters of like name and kind refer to like parts in each of the figures.

The object of my invention has been to provide an improved means for sanding the shucks of match-boxes; and to this end my invention consists in the sanding device, the construction, arrangement, and combination of the parts thereof, and in the combination of such device with means for delivering the box-shucks, as hereinafter specified.

While I have shown and will describe hereinafter my sanding device as applied to a machine for making shucks for match-boxes, which machine, as usual, delivers the completed shucks in flattened form, I do not limit myself to such application of my invention or to the combination of my sanding device with a shuck-making machine or part thereof, but contemplate using such device, where desired, separate from any shuck-forming machine and for applying sand to other things than match-box shucks.

In the drawings, A designates a shaft supported in suitable bearings A' A', (shown in dotted lines in Fig. 1,) which bearings are to be on any suitable frame or support. This shaft A, being used as the driving-shaft to drive my sanding mechanism, is to be rotated by power transmitted by suitable gearing from any motor or source of supply of power. As shown, it has the position of the shaft which supports one of the usual delivery-rolls, which in the well-known forms of match-box-shuck-making machines deliver the completed shucks in flattened form ready for the application of the sand to them. The lower one of these delivery-rollers is shown in position on this shaft in dotted lines at $A^2$, the upper one being similarly shown at $A^3$ in Figs. 2 and 3.

Fixed upon shaft A is the gear-wheel $A^4$, meshing with and driving the gear-wheel B, fixed on shaft B', parallel with shaft A, and journaled in suitable bearings on the frame C C, which supports the operative parts of my sanding mechanism. The base of this frame is provided with slots $c$ $c$, extending in a direction parallel to shaft B', through which slots fastening-bolts $c'$ $c'$ pass down into a suitable base or support C'. The object of this slotted connection between the frame-base and support therefor is to provide for the adjustment of the frame with reference to the delivery-rollers $A^2$ and $A^3$ in a direction parallel to the shafts A and B', in order that the glue and sand-applying devices hereinafter to be described may be adjusted to have the proper desired position with relation to any box-shucks as delivered by said rollers. The said adjustment of the frame is rendered easy, since with the construction described it only necessitates the loosening of the bolts $c'$ $c'$, the moving of the frame to the desired position, and the screwing down of the bolts again to fix the frame as adjusted.

Upon the upright portions of the frame C C is a table $C^2$ in position to receive and support the box-shucks as they pass from the delivery-rollers $A^2$ and $A^3$. Below this table is situated a glue-vat D, containing a quantity of the glue to be used to secure the sand to the shucks. A glue-wheel D', fixed upon shaft B', rotates partially in this vat, so that a portion of it is submerged in the glue within the latter.

Above the glue-wheel D' and close under that portion of the table $C^2$ upon which the box-shucks first pass as they issue from the delivery-rollers is another shaft $D^2$, journaled in suitable supports on frame C C and carrying on one end a gear-wheel $D^3$, meshing with and driven by a larger gear $D^4$, fixed upon and rotating with shaft $B'$.

Upon shaft $D^2$ is fixed a glue-applying wheel $D^5$, which, having its periphery close enough to that of wheel $D'$ to take glue therefrom, has its upper portion projecting up through a slot $c^2$ in the table $C^2$, this slot being but slightly wider than the wheel $D^5$ is thick and preferably being undercut, as shown in Fig. 3.

The periphery of the wheel $D^5$ projects very slightly above the upper surface of the table $C^2$, so as to apply any glue which it may carry to the under surface of any box-shuck passed over it and resting upon the table $C^2$. The upper face of said table has a groove $c^3$, extending rearward from the slot $c^2$ to the rear edge of the plate, such groove having a width substantially equal to or slightly greater than the slot $c^2$, so that the line of glue applied to a box-shuck by the wheel $D^5$ as the shuck is passed on or over the table $C^2$ will not come in contact with the surface of the latter.

In the sanding devices as heretofore made it has been customary to provide the glue roller or wheel, which rotated in the glue-vat, with a regulating-scraper to regulate the thickness of the layer of glue which is taken up and delivered by said wheel. With this construction the great trouble has been that all the parts are liable to get covered with glue, which, after the machine has been idle or not used for a while, hardens, so that it takes considerable time to melt and dissolve when the machine is to be started again. When the scraper is applied to the wheel which rotates in the glue and which, as is well known, brings up a large quantity of glue adhering not only to its face, but to its sides, the scraper and its supports are sure to become completely covered with a large quantity of the glue, which the scraper has to remove from the wheel, the result being that the scraper becomes quickly clogged up and the machine cannot be stopped for a while without danger of the accumulated glue hardening, so as to prevent a subsequent restarting of the machine without the necessity of first removing or softening the clogging mass.

In my mechanism forming the subject-matter of the present application the glue-wheel $D'$ is left free and has no scraper applied to it. Its sides are plain, so that any glue upon them may return readily and unimpeded to the vat.

The material with which I prefer to make both wheels $D'$ and $D^5$ is nickel-bronze, as the glue has no corrosive effect thereon, as it has on the iron or steel of the glue-wheels heretofore used in sanding-machines.

With the shafts, glue-wheels, and connecting-gearing as described hereinbefore and the shaft $A$ revolving in the direction indicated by the arrow in Fig. 2 the glue-applying wheel $D^5$ rotates so that its periphery on its upper side travels in the same direction as the upper side of the shuck-delivering roller $A^2$. The connecting-gearing is so arranged that the rate of travel of the wheel-periphery is the same as that of roller $A^2$. To hold the shucks down upon wheel $D^5$, so that the glue on the latter will be applied evenly and with some pressure to the shucks, I provide a pressure-wheel $D^6$ immediately above wheel $D^5$, fixed upon and rotating with the shaft $D^7$, which is journaled in a swinging bearing $D^8$, pivotally supported from the table $C^2$ by a block $D^9$, secured to the table and having ears $d\ d$, through which and through an opening in a lug $d'$ on the bearing $D^8$ is passed a pivot-pin $d^2$. The shaft $D^7$ being parallel to the shaft $D^2$, which carries the glue-wheel $D^5$, and the pivot-pin $d^2$ being at right angles to the latter shaft the rocking of the bearing $D^8$ on its pivotal support will carry the pressure-wheel $D^6$ toward or from the periphery of the wheel $D^5$. A spring $d^3$ in a recess in block $D^9$ and engaging the bearing $D^8$ at or near its outer end tends to swing the bearing so as to hold the pressure-wheel $D^6$ pressed toward wheel $D^5$, so as to hold any shuck passing below wheel $D^6$ pressed down in position to properly receive the glue from the periphery of wheel $D^5$.

The outer end of the shaft $D^7$ carries a gear-wheel $D^{10}$, which meshes with and is driven by the gear-wheel $D^3$, so that both wheels $D^5$ and $D^6$ will rotate at the same speed and pass any shuck which may be between them onward at substantially the same speed at which the delivery-rollers $A^2$ and $A^3$ deliver it. To insure a good hold on the shuck by the wheel $D^6$, the periphery of the latter is preferably roughened or knurled, as indicated in the drawings. The periphery of the wheel $D^5$ is not made flat or plane, but is provided with a series of narrow circumferential grooves $d^4\ d^4$, preferably, though not necessarily, three in number, as shown in the drawings.

Where the glue-applying wheel is made with its periphery flat or plane, I have found that as a box-shuck passes over and is pressed against it by the pressure-wheel $D^6$ the glue applied to the shuck will be forced outward toward and beyond the sides of the wheel $D^5$, so as to leave two ridges of glue on the box-shuck, with not enough glue between such ridges to properly receive and hold the sand subsequently supplied.

To insure that the layer or strip of glue applied to the box-shuck shall be substantially uniform in thickness and that there shall be enough of the glue not only along the sides of the strip, but across the portion of the latter intervening between such sides, I groove the glue-applying wheel $D^5$, as shown and described hereinbefore. These grooves prevent the glue from being forced to the sides of the layer of glue, as where a plane wheel is used, when the shuck passes over and is pressed upon the wheel. Instead of flowing out beyond the sides of the wheel to form ridges along the sides of the glue-layer on the shuck the glue under pressure flows along the grooves.

The glue from the grooves in the wheel $D^5$ forms narrow ridges on the shuck, joined by thinner portions of glue, and these ridges being only short distances apart readily flow together after the shuck passes the wheel, so as to form a substantially uniform layer of glue of sufficient thickness to properly receive and firmly hold the sand applied to it.

The depth of the grooves in the wheel $D^5$ can be adjusted so as to secure the application of just the right quantity of glue.

To regulate the quantity of glue which will be carried up and applied to the shucks by the wheel $D^5$, I provide the scraper E, consisting of a plate with its edge parallel with the periphery of the wheel $D^5$, adapted to be moved toward or from such periphery by the rocking of the bar $E'$, to which the plate is attached. From this bar the plate projects at an angle toward the wheel $D^5$ and rearward with reference to the rotation of the latter.

The bar E is pivotally supported by blocks $e'$ $e'$, attached to frame C C and having pintles $e^2$ $e^2$ entering suitable pivotal holes in the bar ends. An adjusting-arm $E^2$, attached to bar $E'$, extends rearward under table $C^2$ to a point where it can be readily reached by the operator, its rear end being supported by a spring $e^3$, attached to it and to a suitable support on the machine-frame, so that the arm is drawn upward with a yielding pressure to keep the edge of the scraper-plate E at the desired distance from the periphery of wheel $D^5$. An adjusting-screw $e^4$, tapped through a bearing $e^5$ on frame C C, serves to limit the upward movement of arm $E^2$ under stress of spring $e^3$. The lower end of this screw is in position to act as a stop for the arm, and its position can be changed at will by turning the screw to adjust the normal position of the scraper edge with reference to the periphery of wheel $D^5$. Near its rear edge the table $C^2$ has a second slot or opening $c^4$, whose upper end is in the groove $c^3$. Such opening, which preferably is undercut on all sides, as indicated in the drawings, is for the passage of sand up to and against the glue which has been applied to a shuck on table $C^2$ by the glue-applying devices described.

Below the table $C^2$ is a sand-holding box F, supplied with sand from a hopper $F'$ or other source of supply through the pipe $F^2$. To throw the sand in this box up through the opening $c^4$ against the glue on a shuck, so that it will adhere strongly to such glue, I provide the wheel $F^3$, provided with a series of blades or arms $ff$, adapted as the wheel is revolved rapidly to take up some of the sand in the box F and throw it with force upward toward and through said opening $c^4$.

The outer end or side of the sand-box has its bottom inclined downward and inward toward the space under the sand-wheel, so that any sand on such bottom will work inward toward the point where it can be reached by the wheel blades or arms. For driving this sand-wheel I provide the shaft $F^4$, by which the wheel is carried and which is supported in suitable bearings on frame C C, and the box sides with a pinion $F^5$, which meshes with and is driven by a gear-wheel $F^6$, journaled on a stud-bearing $f'$ on frame C C and having rotating with it a pinion $F^7$, meshing with and driven by the gear-wheel $D^4$ on shaft $B'$.

The bearings $F^8$ $F^8$ for shaft $F^4$, which are supported in the sides of the sand-box F, are made as shown best in Figs. 1 and 5—that is, in the form of tubular tapering pieces tapped through the box-walls and extending in along the shaft to the sides of the sand-wheel $F^3$, so that the shaft is protected from the sand in the box. With this construction and the inner ends of the tubular bearings $F^8$ $F^8$ in contact with the sides of the sand-wheel there is no point where the shaft rotating in the bearings is exposed to the sand, so that the latter would be liable to work in between the shaft-periphery and the bearings, nor are the points where the sand-wheel rotates in contact with the ends of the bearings exposed to any body of sand resting in the box. The blades or arms $ff$ keep the sand about the wheel stirred up and loosened, so that it cannot become packed about and press upon the adjoining portions of the wheel sides and bearings in such way as to interfere with the turning of the wheel.

For the purpose of adapting my mechanism for use with shucks of various sizes I provide the table $C^2$ with adjustable guides G G on opposite sides of groove $c^2$, each of such guides consisting of a plate having on its inner side an overhanging flange $g$ to project slightly over the edge of the shuck and keep it down in place on the table as it is moved out over the latter by the delivery-rolls and the two wheels $D^5$ and $D^6$. On the outer side of each of these guides are two slotted plates $g'$ $g'$, resting upon the table $C^2$ and secured thereto by bolts $g^2$ $g^2$, passing through the plate-slots and tapped into the table. With this construction when the bolts $g^2$ $g^2$ are loosened the guides can be adjusted toward or from each other to any desired position suited to the proper guiding of the shucks to be sanded, and can then be fastened in place as adjusted by screwing down the bolts again to clamp the slotted plates $g'$ $g'$ firmly against the table.

The operation of my sanding mechanism, which will be understood from the foregoing description and the drawings, is, briefly, as follows: The frame C C is adjusted upon its support so that the glue-applying wheel and the sand-wheel will be in line with that portion of the shucks delivered by the delivery-rollers $A^2$ $A^3$ which is to be sanded, and then the bolts $c'$ $c'$ are tightened up to secure the frame in its desired position. The guides G G having been adjusted in the manner hereinbefore described to engage and properly guide the edges of the shucks as the latter pass over table $C^2$, the machine is put in action. The glue-wheel $D'$, revolving in the glue-vat, then takes a quantity of glue up on its periphery and carries it up to the wheel $D^5$, which takes from the former wheel a layer of glue on its own periphery and in its grooves and carries it upward toward the shucks, which are being delivered by the delivery-rollers $A^2$ and $A^3$ and carried along between wheels $D^5$ $D^6$. The scraper-plate E, being set to have its edge at a distance from the periphery of wheel $D^5$ equal to the thickness of the layer of glue which it is desired the periphery should bring up to the shucks, removes any glue in excess of such layer, and the quantity thus removed falls down into the vat, or if it strikes the wheel $D'$ is carried over freely by the same. As the wheels $D^5$ $D^6$ revolve and the shucks are carried along between them, the wheel $D^6$ presses the shucks down upon the glue brought up past the scraper by the wheel $D^5$. The result is that the wheel applies to the shuck a layer of glue containing several narrow ridges close enough to each other to readily join and flow together after the wheel $D^5$ is passed, so as to form a layer or strip of glue on the shuck substantially uniform in thickness throughout its width. By the onward movement of the shuck the freshly-glued surface is brought over the opening $c^4$ in the table $C^2$, up through which the sand is being thrown from the sand-box F. The sand thus forcibly thrown against the glue on the shuck enters and adheres to the same, so that it will be firmly held when the glue dries. With the described groove $c^3$ in the table extending from the glue-opening $c^2$ to the end of the table neither the strip of glue nor the sand applied to the same comes in contact with any rubbing-surface before it leaves the table.

The amount of glue which will be applied to the box-shucks by wheel $D^5$ can be readily regulated at will by screwing the adjusting-screw $e^4$ up or down to allow the spring $e^3$ to hold the arm higher or lower to bring the edge of the scraper-plate E nearer to or farther from the periphery of the glue-applying wheel $D^5$.

Having thus described my invention, what I claim is—

1. In mechanism for sanding box-shucks, in combination with the shuck-supporting table having a groove in its upper face, an opening for the glue-applying device in line with such groove, and a second opening in the bottom of the groove beyond the first opening, a glue-applying device to apply glue to the shucks through the first opening, and means for applying sand to the glued part of the shucks through the second opening, substantially as and for the purpose specified.

2. In mechanism for sanding shucks, in combination with the shuck-supporting table, provided with a groove, the glue-applying wheel projecting up through an opening in the table, in line with the groove in the latter, means for supplying glue to such wheel, a sand-containing box or receptacle, and means for delivering sand therefrom, through an opening in the bottom of the groove in the table, against the glued part of the shucks, brought over such opening by the feeding of the shucks over the table, substantially as and for the purpose shown.

3. In combination with the table provided with the opening for the passage of the glue-applying device, a groove extending from such opening, and a second opening in the bottom of the groove, the glue-applying wheel projecting up through the first opening, means for supplying such wheel with glue, a sand-containing box below the second opening in the table, a sand-throwing wheel in the box, adapted, as it revolves, to throw the sand up through the opening in the table, and means for rotating the glue-applying and sand-throwing wheels, substantially as and for the purpose set forth.

4. In combination with the table having an opening for the glue-applying wheel, a groove extending out along the table in line with such opening, and a second opening in the bottom of such groove having its sides undercut, the glue-applying wheel projecting up through the first opening in the table, means for supplying it with glue, the sand-containing box below the second opening, the sand-throwing wheel revolving in such box and having arms or blades to engage the sand in the box and throw it up through the opening above the box, and means for rotating the two wheels, substantially as and for the purpose described.

5. In combination with the box for containing sand, the sand-throwing wheel rotating therein, having blades or arms to engage and throw the sand, the shaft carrying such wheel, and the tubular bearing for the shaft extending in around the latter, from the walls of the sand-box, to the sides of the sand-throwing wheel, substantially as and for the purpose specified.

In testimony that 1 claim the foregoing I have hereunto set my hand this 21st day of December, A. D. 1896.

JACOB P. WRIGHT.

Witnesses:
L. W. BEECHER,
H. D. STANNARD.